United States Patent
DiBenedetto et al.

(10) Patent No.: US 10,095,754 B1
(45) Date of Patent: Oct. 9, 2018

(54) PRESENTING IMAGES CORRESPONDING TO FEATURES OR PRODUCTS MATCHING PARTICULAR ROOM TYPE AND DÉCOR STYLE

(71) Applicant: DREAM BOOK, LLC, Avon, OH (US)

(72) Inventors: Michael DiBenedetto, Avon, OH (US); Jared Bacik, Brunswick, OH (US)

(73) Assignee: DREAM BOOK, LLC, Avon, OH (US)

( * ) Notice: Subject to any disclaimer, the term of this patent is extended or adjusted under 35 U.S.C. 154(b) by 0 days.

(21) Appl. No.: 15/953,679

(22) Filed: Apr. 16, 2018

Related U.S. Application Data (60) Provisional application No. 62/584,579, filed on Nov. 10, 2017.

(51) Int. Cl.
*G06F 17/30* (2006.01)
*G06Q 30/06* (2012.01)

(52) U.S. Cl.
CPC ...... *G06F 17/3053* (2013.01); *G06F 17/3028* (2013.01); *G06F 17/30256* (2013.01); *G06F 17/30268* (2013.01); *G06F 17/30274* (2013.01); *G06Q 30/0625* (2013.01); *G06Q 30/0643* (2013.01)

(58) Field of Classification Search
CPC .......... G06F 17/3053; G06F 17/30256; G06F 17/30268; G06F 17/30274; G06Q 30/0625; G06Q 30/0643
USPC ....................................................... 707/749
See application file for complete search history.

(56) References Cited

U.S. PATENT DOCUMENTS

| | | |
|---|---|---|
| 6,772,393 B1 | 8/2004 | Estrada et al. |
| 6,928,454 B2 | 8/2005 | Menner et al. |
| 7,661,958 B2 | 2/2010 | Meyer et al. |
| 7,815,435 B2 | 10/2010 | Riley |
| 7,966,567 B2 | 6/2011 | Abhyanker |
| 8,434,250 B2 | 5/2013 | Epp |
| 8,989,440 B2 | 3/2015 | Klusza et al. |
| 9,110,999 B2 | 8/2015 | Shagrithaya et al. |
| 9,195,677 B2 | 11/2015 | Ball et al. |
| 9,213,785 B2 | 12/2015 | Plewe |
| 9,292,162 B2 | 3/2016 | Topakas et al. |
| 9,396,493 B2 | 7/2016 | Bhardwaj et al. |
| 9,465,512 B2 | 10/2016 | Topakas et al. |
| 9,483,158 B2 | 11/2016 | Topakas et al. |
| 9,582,163 B1 | 2/2017 | Banschick et al. |
| 9,785,727 B1 | 10/2017 | Wilson |

*Primary Examiner* — Grace Park
*Assistant Examiner* — Jessica N Le
(74) *Attorney, Agent, or Firm* — Renner, Otto, Boisselle & Sklar, LLP (57) ABSTRACT

Techniques are disclosed herein for presenting feature images corresponding to visual depictions of features or products matching a particular room type and décor style. The techniques may be used assist homeowners in the design or decoration of their home, thereby improving home improvement results and the user experience. The techniques described herein allow the homeowner or user to adequately select building materials and décor items by themselves because they can rely on other users' experiences, a form of crowdsourcing that promotes satisfactory results. The techniques disclosed herein may provide a crowdsourced starting point based on an iterative process and customization options based on the particular user's own taste and budget.

2 Claims, 10 Drawing Sheets

PRESENTING IMAGES CORRESPONDING TO FEATURES OR PRODUCTS MATCHING PARTICULAR ROOM TYPE AND DÉCOR STYLE

BACKGROUND

Home remodeling and renovation projects involve the remodeling of internal living spaces such as kitchens, bathrooms, and bedrooms as well as external spaces such as gardens, garages, and lawns. U.S. home improvement and repair expenditures have been estimated to exceed 300 billion dollars a year. Homeowners undertake home improvement projects to make their homes more comfortable and welcoming, and to increase the value of their homes. Some homeowners enlist professionals to design or decorate their living spaces. Most homeowners, however, have at least the desire to design or decorate their homes themselves. On the one hand, there has never been a better time for do-it-yourself home improvement. Manufacturers and retailers have made available to homeowners an ever increasing variety of home improvement materials. Unfortunately, most homeowners do not possess the training or experience to adequately select materials from the ever increasing variety of different styles and features.

Some tools exist to assist homeowners in the design or decoration of their home. Unfortunately, conventional tools for designing or decorating living spaces are unsophisticated. They, for example, do not address the problem of finding different décor items that match or harmonize to a particular style. Conventional tools lack the ability to select building materials and décor items with visually common features, such as color or style, which look pleasant together. The current tools further lack the ability to search the whole market for building materials and décor items based on décor style. Homeowners often find themselves overwhelmed over a home improvement project or disappointed of the results.

SUMMARY

The present disclosure describes novel techniques to assist homeowners in the design or decoration of their home, thereby improving results and the user experience. Homeowners, who do not possess the training or experience to adequately select by themselves from the ever increasing variety of different styles, materials, and features, can now confidently build the living spaces of their dreams. The techniques described herein allow the homeowner or user to adequately select building materials and décor items by themselves because they can rely on other users' experiences, a form of crowdsourcing that promotes satisfactory results. The techniques disclosed herein may provide a starting point and, using an iterative process and customization options that take into account the particular user's own taste and budget, arrive at a complete room design.

Although the techniques disclosed herein may be applicable to home design and decoration, the techniques disclosed herein represent technical improvements to computer technology. The technical improvements described herein are somewhat analogous to those embodied by the Google® search engine. That search engine may be helpful to users in searching the Internet to find anything from information about people and places to food recipes. That the Google® search engine is relevant to such non-technical human endeavors does not negate the fact that the engine represents (or at least at the time of its invention represented) a significant technical improvement in the computer technology field. Similarly, the techniques disclosed herein may have application in home design and decoration but this should not negate the fact that the techniques represent a significant technical improvement in the computer technology field. The techniques disclosed herein improve the manner in which computer images (which happen to correspond to features or products) are presented to computer users so that such presentation of the images is more useful and more accurate to users. An improvement in the way computer images are presented to a user is indeed a technical improvement or benefit. And such improvement or benefit inures from the techniques disclosed and claimed herein.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
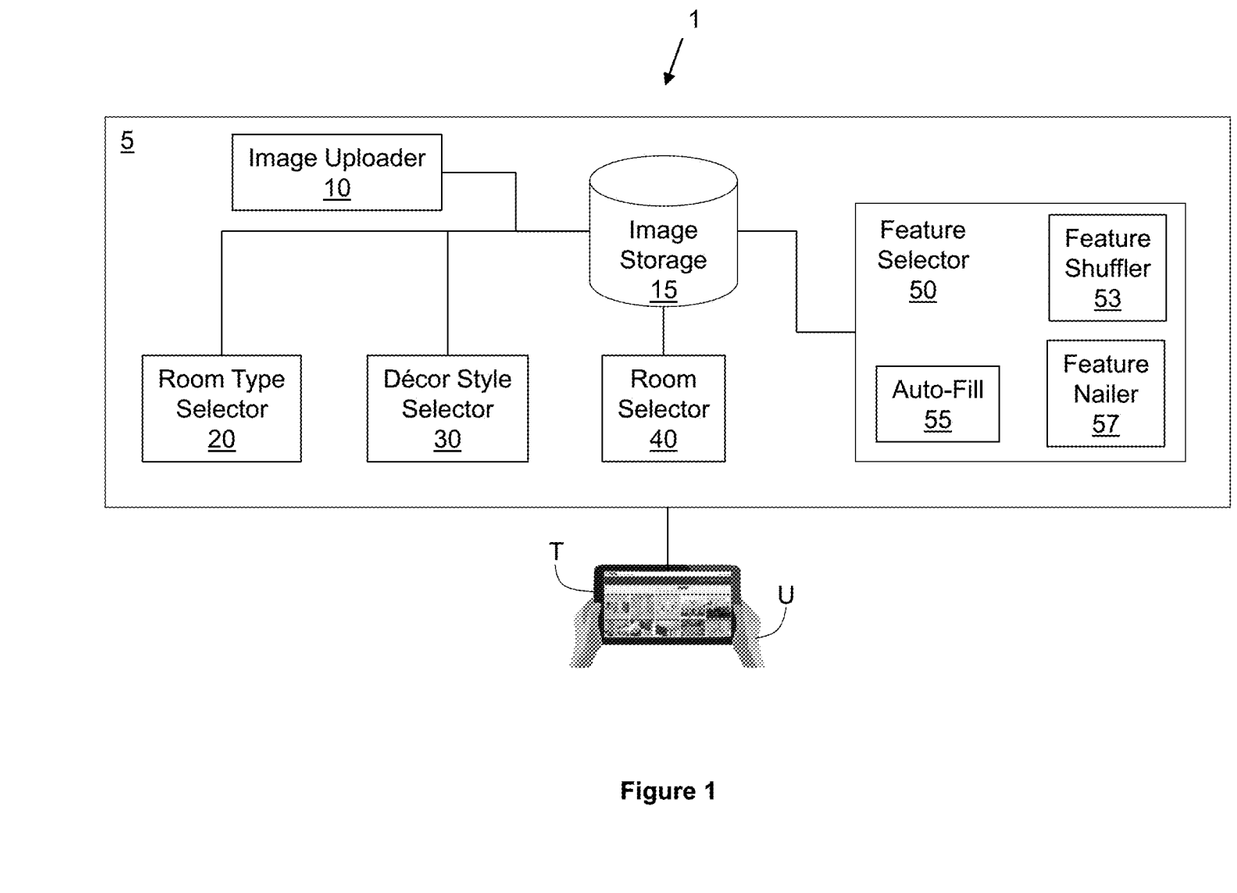
FIG. 1 illustrates a block diagram of an exemplary environment in which the technology disclosed herein may operate in various embodiments.

FIG. 1 illustrates a block diagram of an exemplary environment 1 in which the technology disclosed herein may operate in various embodiments. The environment 1 includes the system 5 with which a user U may interact via, for example, tablet T. The system 5 may include an image uploader 10 as described below and an image storage 15 in which images such as room type images, décor style images, room images, feature images, etc. may be stored to be used as described below.

The system 5 may include the image uploader 10 that gives the user U the ability to upload to image storage 15 rooms and features for those rooms. Uploading a room may include uploading a room image and corresponding feature images of features in the room. The user may tag the room images and the feature images as, for example, corresponding to a room type (e.g., kitchen, garage, bathroom, etc.), a décor style (e.g., farmhouse, mediterranean, etc.), and a feature type (e.g., flooring, lights, etc.) The room images and feature images may be tagged to identify the user who uploaded the images. The room images and feature images may also be tagged to include specific information regarding the features such as dimensions, specifications, where to purchase, price, a stock keeping unit (SKU) number, etc. Other tags may include a running tag that includes information as to how many times the room image or the feature image has been selected or "nailed" by other users to include in their own rooms. As described below, the system 5 may use the tag information as part of its algorithms to make recommendations for rooms and features to users.

Figure 2:
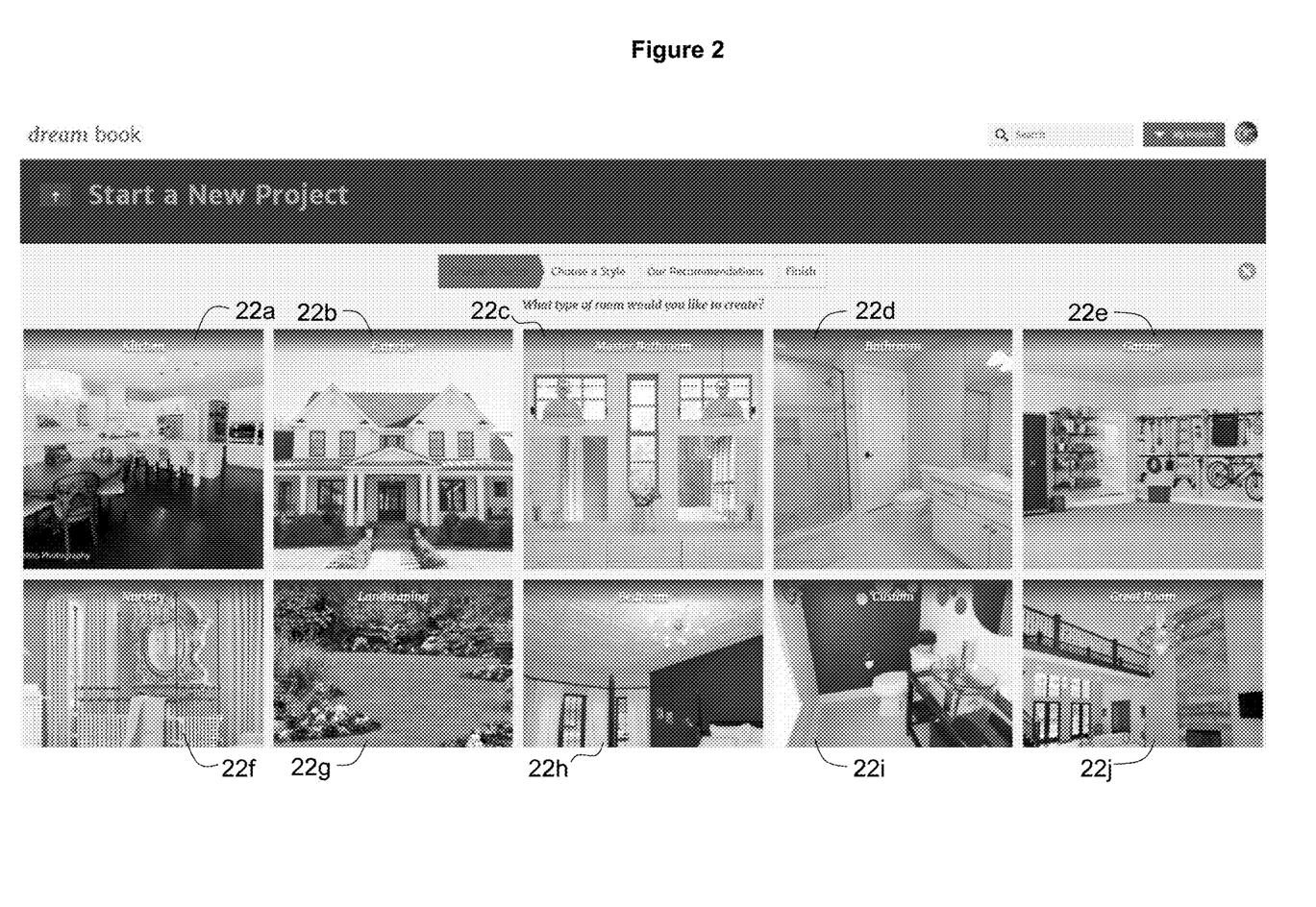
FIG. 2 illustrates an exemplary screen shot displaying room type images.

The system 5 may include a room type selector 20 that may present room type images to the user U. As shown in FIG. 2, the room type images 22*a-j* are visual depictions of room types such as kitchen 22*a*, home exterior 22*b*, master bathroom 22*c*, bathroom 22*d*, garage 22*e*, nursery 22*f*, landscaping 22*g*, bedroom 22*h*, custom room, 22*i*, great room 22*j*, etc. The user U looking to design or decorate, for example, a kitchen may select room type image kitchen 22*a*. The room type selector 20 receives the user input indicating selection by the user of the particular room type (e.g., kitchen).

Returning to FIG. 1, the system 5 may also include a décor style selector 30 that may present décor style images to the user U. The décor style selector 30 may receive the user input indicating selection by the user of kitchen 22*a* as the particular room type to be designed or decorated and, based on this user input, present décor style images of the particular room type (e.g., kitchen) designed or decorated in various décor styles.

Figure 3:
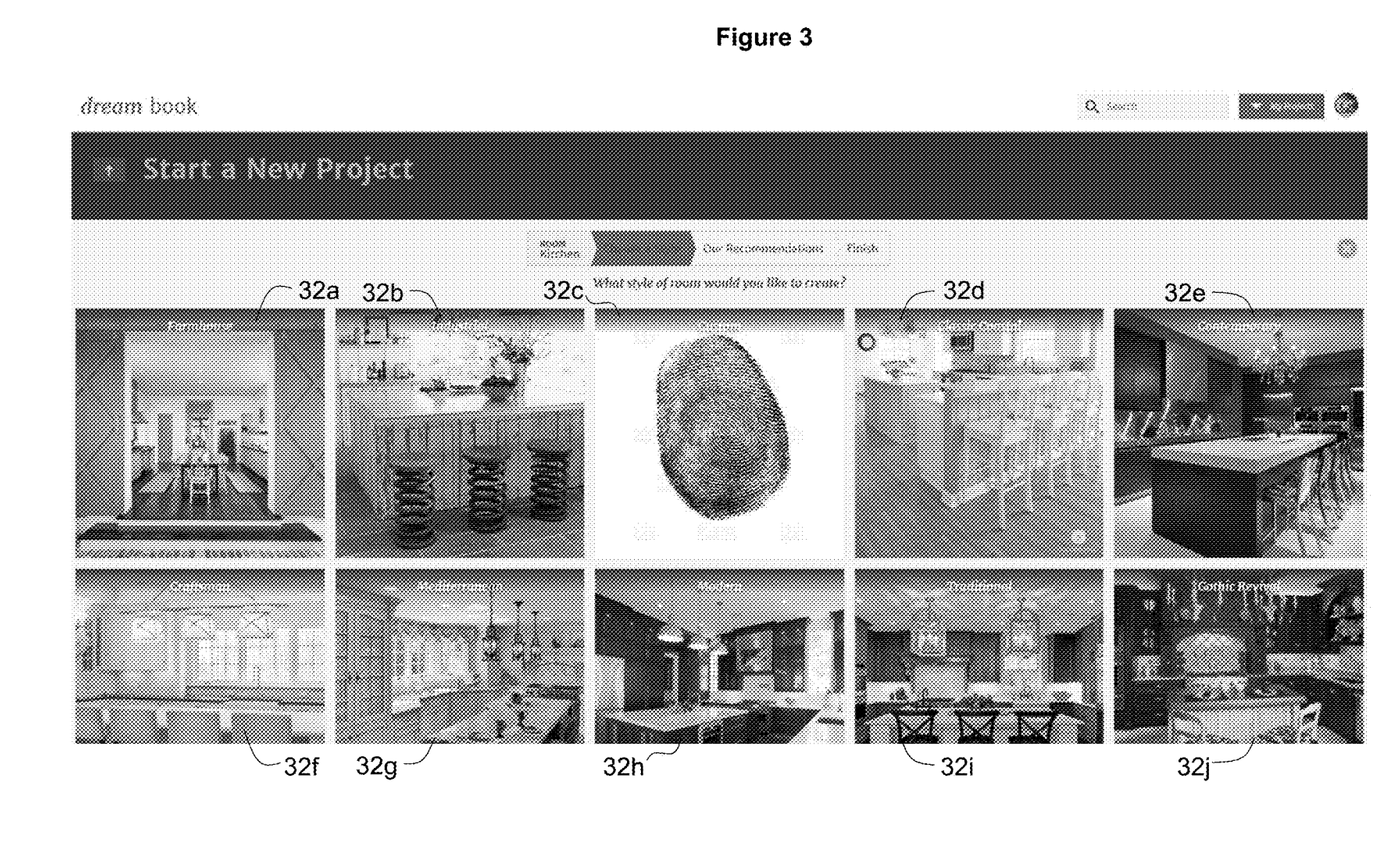
FIG. 3 illustrates an exemplary screen shot displaying décor style images.

As shown in FIG. 3, the décor style images 32*a-j* are visual depictions of décor styles such as farmhouse 32*a*, industrial 32*b*, custom style 32*c*, classic coastal 32*d*, contemporary 32*e*, craftsman 32*f*, mediterranean 32*g*, modern 32*h*, traditional 32*i*, gothic revival 32*j*, etc. In the embodiment of FIG. 3 the décor style images 32*a-j* are visual depictions of kitchens because, in this example, the user U had previously selected kitchen 22*a* as the room type. In other examples, the décor style images would be visual depictions of other room types as selected by the user U.

The user U looking to design or decorate, for example, a kitchen in farmhouse style may select room type image farmhouse 32*a*. The décor style selector 30 receives the user input indicating selection by the user of the particular décor style (e.g., farmhouse).

Although in the present embodiment the system 5 presented the user U the opportunity to first select the room type and second the décor style, in other embodiments, the system 5 may present the user U the opportunity to first select the décor style and second the room type. Also, a user may know the room type (e.g., kitchen) she wants to design but not the décor style. The décor style selector 30 may help the user arrive at a décor style visually or the user may skip to room selections.

Figure 4:
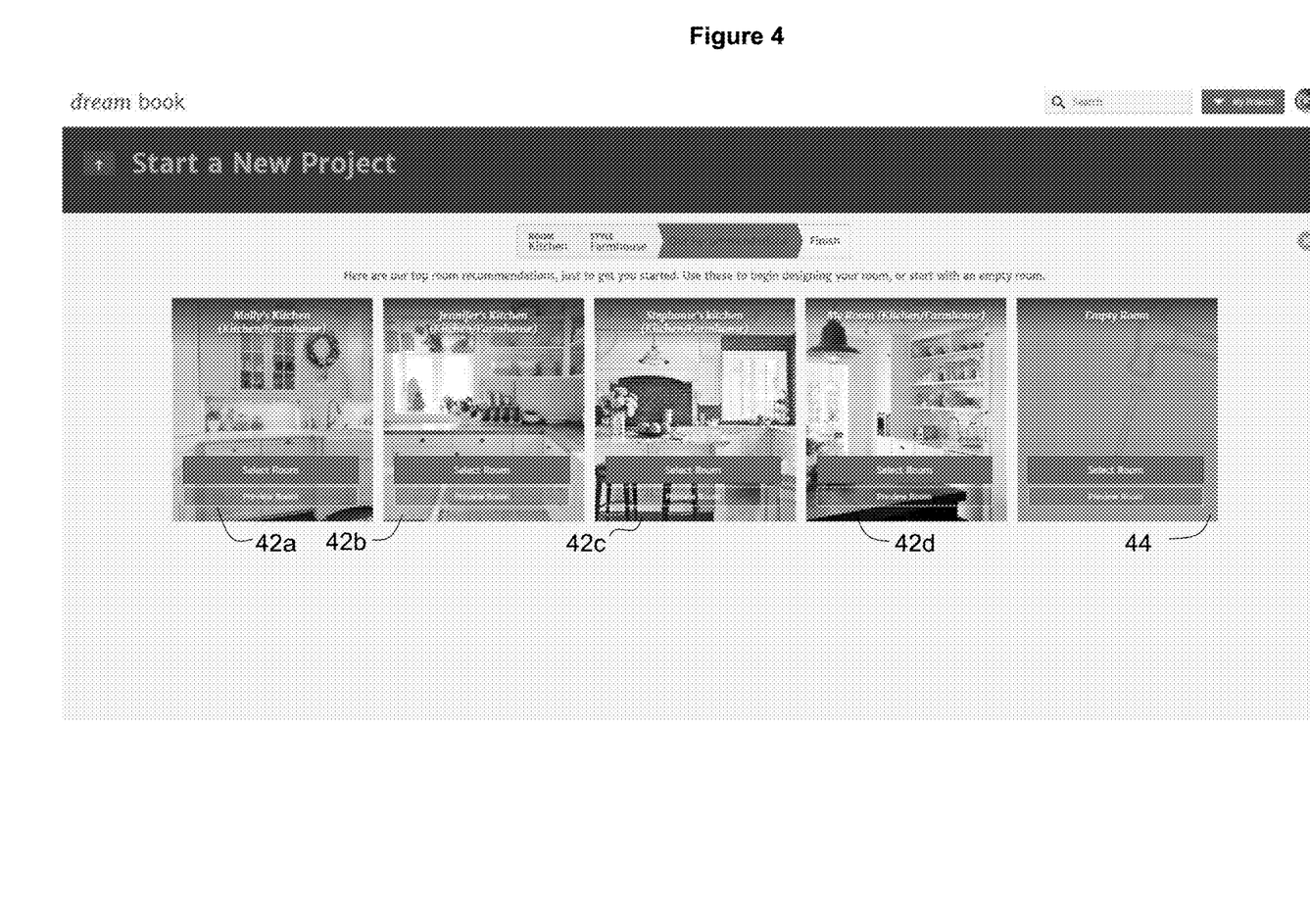
FIG. 4 illustrates an exemplary screen shot displaying room images.

Returning to FIG. 1, the system 5 may also include a room selector 40 that may present room images to the user U. The room selector 40 may receive the user input indicating selection by the user of kitchen 22*a* as the particular room type to be designed or decorated and of farmhouse 32*a* as the particular décor style. As shown in FIG. 4, based on this user input, room selector 40 may present room images 42*a-d* of the particular room type (e.g., kitchen) designed or decorated in the particular décor style (e.g., farmhouse). The room images 42*a-d* are visual depictions of rooms of the particular room type (e.g., kitchens) decorated in the particular décor style (e.g., farmhouse).

The room images 42*a-d* are visual depictions of rooms suggested to the user U by the system 5 to use as their starting point or guideline for designing or decorating the same room type in their home. The room images 42*a-d* may correspond to room images (and their corresponding feature images as described below) uploaded to the system 5 and stored in the image storage 15 by, for example, other users. Other users may include other regular users and also professional designers. In the example of FIG. 4, the room images correspond to kitchens decorated in farmhouse style including Molly's kitchen 42*a*, Jennifer's kitchen 42*b*, Stephanie's kitchen 42*c*, and an anonymous kitchen titled My Room 42*d*.

The user U looking to design or decorate, for example, a kitchen in farmhouse style may select Molly's kitchen 42*a* as the particular room the user U wishes to emulate in their design or decoration. The room selector 40 receives the user input indicating selection by the user of the particular room (e.g., Molly's kitchen).

The room selector 40 may, in addition to the room images 42*a-d*, also present to the user an empty room 44 that a user U may select if the user U, for example, does not like any of the room images 42*a-d* presented. The user U may select the empty room 44 to proceed to being presented with feature images for the selected room type and décor style that do not necessarily belong to any particular room.

Figure 5:
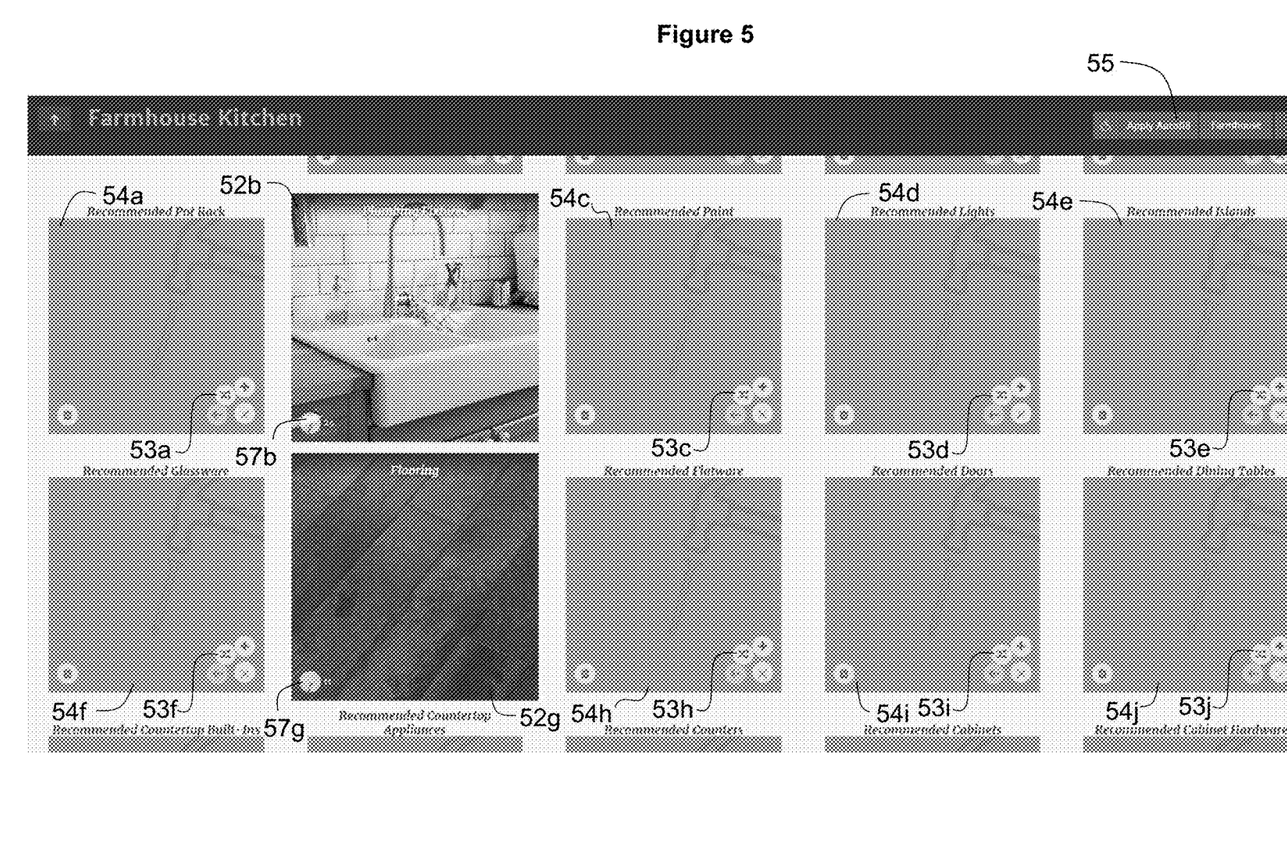
FIG. 5 illustrates an exemplary screen shot displaying a first group of feature images.

Returning to FIG. 1, the system 5 may also include a feature selector 50 that may present feature images to the user U. The feature selector 50 may receive the user input indicating selection by the user U of Molly's kitchen as the particular room the user U wishes to emulate. As shown in FIG. 5, based on this user input, feature selector 50 may present feature images 52*b* and 52*g* of the particular room (e.g., Molly's kitchen). The feature images 52*b* and 52*g* are visual depictions of features or products matching a particular room type (e.g., kitchen) and a particular décor style (e.g., farmhouse) as used by the other user who uploaded the room (e.g., Molly) in her room (e.g., Molly's kitchen). In the example of FIG. 5, the feature images correspond to plumbing fixtures 52*b* and flooring 52*g* that, at least according to the other user (e.g., Molly), belong in the particular room (e.g., kitchen) decorated in the particular décor style (e.g., farmhouse).

Notice that in FIG. 5 there are no feature images for other features such as pot rack 54*a*, paint 54*c*, lights 54*d*, islands 54*e*, glassware 54*f*, flatware 54*h*, doors 54*i*, and tables 54*j*. In this example, Molly's kitchen did not include those features. The room is not complete. Presumably the user U would also like recommendations for those missing features 54 because the user U would want a room that is complete. The system 1 provides the user U those recommendations.

Figure 6:
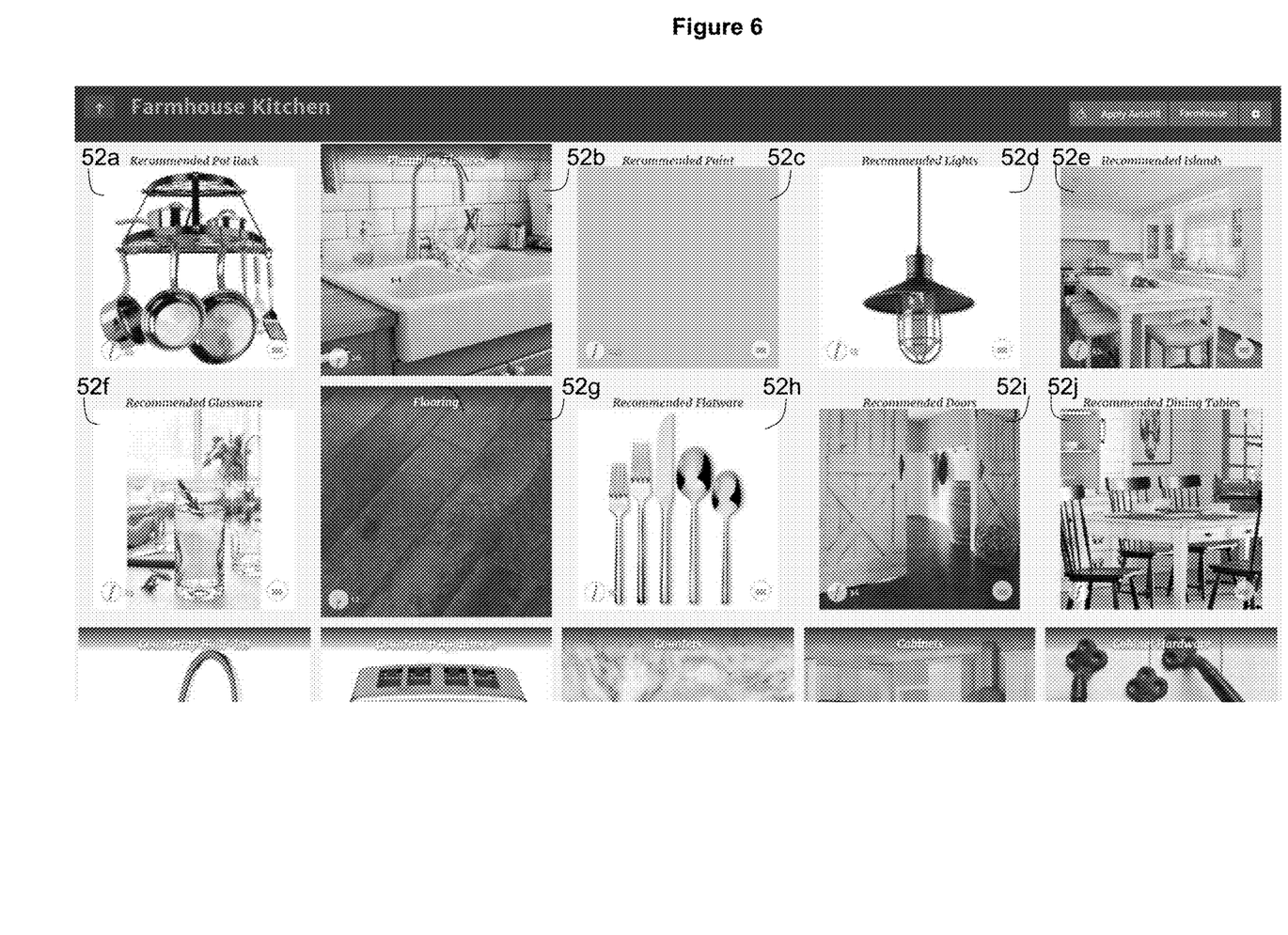
FIG. 6 illustrates an exemplary screen shot displaying a second group of feature images.

Returning to FIG. 1, the feature selector 50 may include a feature shuffler 53. As shown in FIG. 5, the feature selector 50 displays in association with each of the missing features 54 feature shufflers 53*a*, 53*c*, 53*d*, 53*e*, 53*f*, 53*h*, 53*i*, and 53*j*, which are selectable by the user U to shuffle the respective feature. For example, user U may select feature shuffler 53*a* to obtain a feature image for the missing feature 54*a*. The user U may repeat this function for each of the missing features 54 by selecting the corresponding feature shuffler 53. As shown in FIG. 6, upon the user U selecting the feature shuffler 53 for each of the missing features 54, the feature selector 50 presents a second group of feature images that now includes the first feature images 52*b* and 52*g* and recommended features images for pot rack 52*a*, paint 52*c*, lights 52*d*, islands 52*e*, glassware 52*f*, flatware 52*h*, doors 52*i*, and tables 52*j* to fill the previously missing features.

Figure 7:
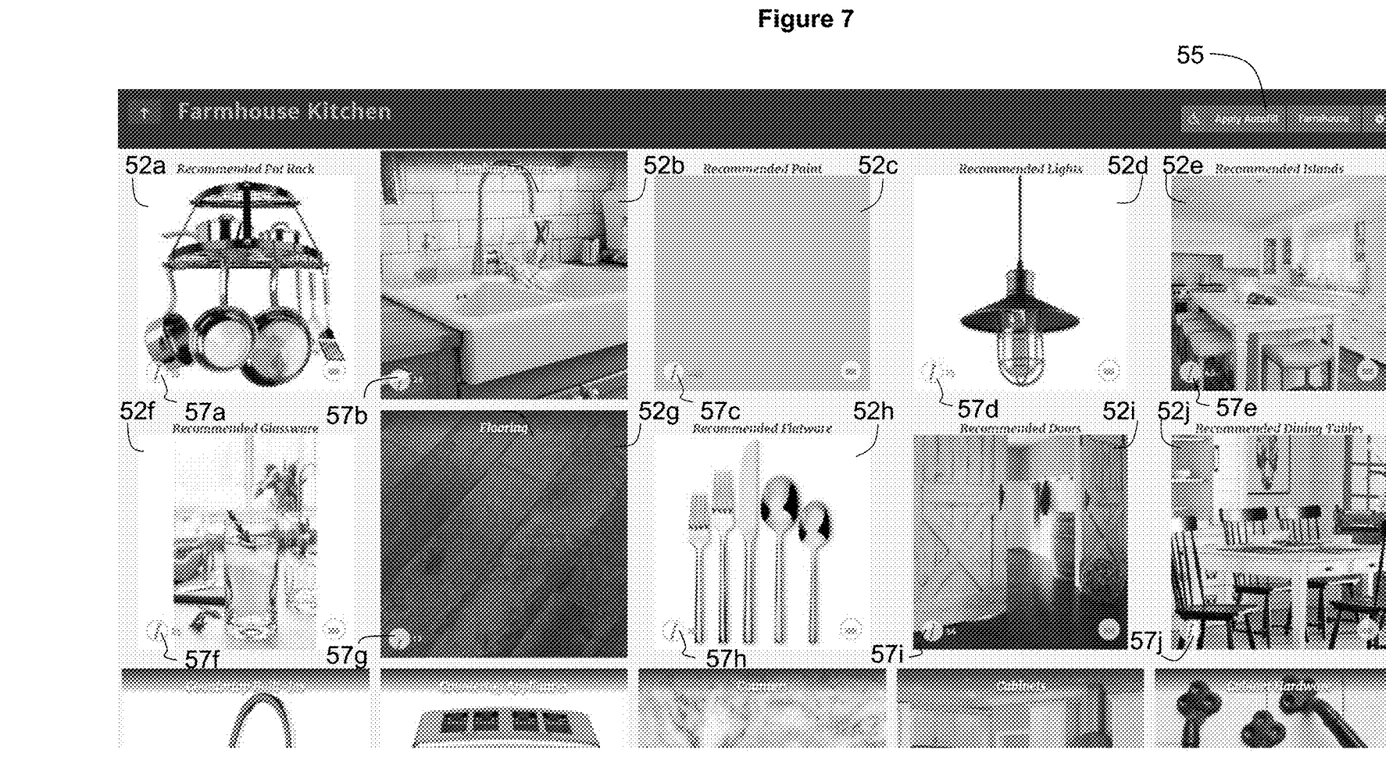
FIG. 7 illustrates an exemplary screen shot displaying a second group of feature images.

Another, and perhaps more efficient, way of accomplishing a complete room is by using the auto-fill function. Returning to FIG. 1, the feature selector 50 may include an auto-fill function 55 selectable by the user U to command presentation of feature images for the missing features 54 so that the room is complete. As shown in FIG. 5, the feature selector 50 may include the auto-fill function 55 that the user U may select to command the feature selector 50 to present feature images that include the first feature images 52*b* and 52*g* and feature images for the missing features 54. As shown in FIG. 7, upon the user U selecting the auto-fill function 55, the feature selector 50 presents a second group of feature images that now includes the first feature images 52*b* and 52*g* and features images for pot rack 52*a*, paint 52*c*, lights 52*d*, islands 52*e*, glassware 52*f*, flatware 52*h*, doors 52*i*, and tables 52*j* to fill the previously missing features.

Now that the room is complete, it may be that the user U likes all of the suggested features and wishes to save the room. Or perhaps the user U likes only some of the suggested features and dislikes others. The system 1 provides the user U the opportunity to nail those features that the user wishes to lock in or retain.

Returning to FIG. 1, the feature selector 50 includes a feature nailer 57. As shown in FIG. 7, the feature selector 50 displays in association with each of the feature images 52*a-j* the feature nailers 57*a-h*, which are selectable by the user U to lock or retain its associated feature image 52*a-j*.

Thus, let's say that the user U likes all of the suggested features and wishes to save the room. In this case, the user U would indicate her wish to nail all features by selecting the feature nailers 57*a-j*. The result is shown in FIG. 8, which shows a truly complete room with all feature images 52*a-j* nailed.

Let's say, however, that the user U likes only some of the suggested features and dislikes others. In this case, the user U would indicate her wish to retain or lock in only some of the suggested features by selecting the feature nailers 57 of the features she wishes to nail down. Returning to FIG. 7, let's say, for example, that the user U wishes to retain or lock in the feature images 52*b* and 52*g* and receive different recommendations for the features images for pot rack 52*a*, paint 52*c*, lights 52*d*, islands 52*e*, glassware 52*f*, flatware 52*h*, doors 52*i*, and tables 52*j*. In this case, the user U would indicate her wish to retain or lock in only feature images 52*b* and 52*g* by selecting only the feature nailers 57*b* and 57*g* and not the other feature nailers. The user may then use the auto-fill function 55 for the features images for pot rack 52*a*, paint 52*c*, lights 52*d*, islands 52*e*, glassware 52*f*, flatware 52*h*, doors 52*i*, and tables 52*j* to be replaced with new recommendations.

Figure 8:
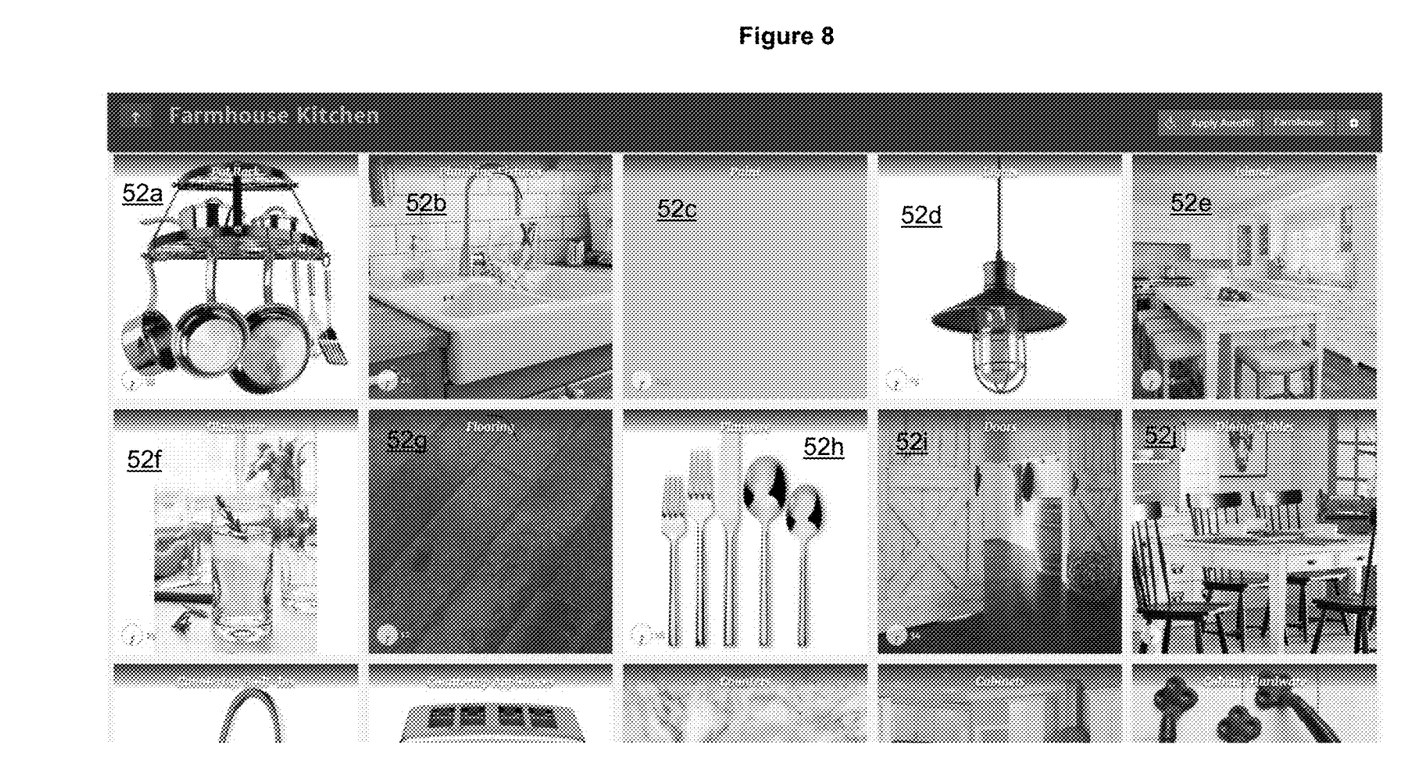
FIG. 8 illustrates an exemplary screen shot displaying a complete room.

The user U may repeat this nailing and auto-fill process until the user U is satisfied or until the room is complete with feature images 52 that the user likes such as the complete room of FIG. 8. The user U may then save the room. The user U may click on the feature images 52 or create a report of the complete room to obtain information about the features including dimensions, specifications, where to purchase, price, SKU number, etc. so that the user U may build her room in her home.

Significantly, the user U may proceed with actually designing and building her room in her home. Once the real world room is complete, the user U may take pictures of the room and use the image uploader 10 to upload the room image of that room to the image storage 15. The user U may tag the room image with a room type, décor style, etc. The user U may also associate the room image with feature images corresponding to features the user U actually used in building her real world room. This way, a future user may have the opportunity to choose the user U's room in designing his own room. The database of rooms in image storage 15 will grow and give users ever more choices that are, based on the intelligence of the system 5, very likely to be pleasant and satisfying to users of the system 5.

Room Selector 40

As described above in reference to FIG. 4, based on user input, room selector 40 may present room images 42*a-d* of the particular room type (e.g., kitchen) designed or decorated in the particular décor style (e.g., farmhouse). In one embodiment, the room selector 40 determines the room images 42 to be presented or the order in which the room images 42 are to be presented based on a ranking of the room. Such ranking may be based on one or more of: popularity of a room image relative to all (or at least a larger set of) room images in images storage 15, age of a room image relative to all (or at least a larger set of) room images in images storage 15, completion of a room corresponding to a room image relative to all (or at least a larger set of) room images in images storage 15, whether the room image's tags match the décor style, strength of a user corresponding to a room image relative to a set of users corresponding to all (or at least a larger set of) room images in images storage 15, a user's selected preferences in system 5, a user's browsing history or browsing pattern in or outside the system 5, sponsorship of features in the room, etc.

The popularity (p) of a room image relative to all (or at least a larger set of) room images in images storage 15 may be determined by assigning to each room image in the set of room images a popularity score based on a number of times each room image or feature images corresponding to each room image has been selected by users. More specifically, the popularity (p) of a room image relative to all (or at least a larger set of) of room images in images storage 15 may be determined by calculating for each room image in the set of room images $$p = (\log_{10}(s) * x) + w(c), \text{ where}$$

s=score corresponding to a number of times each room image or feature images corresponding to each room image has been selected by users,
x=a score weight factor (e.g., 50, 500, 5000), and
w(c)=the lower bound of the Wilson score confidence on the number of times each room image or feature images corresponding to each room image has been indicated as a favorite by users versus the number of times each room image or feature images corresponding to each room image has been selected by users.

$$w(c) = \left( \hat{p} + \frac{z_{\alpha/2}^2}{2n} \pm z_{\alpha/2}\sqrt{[\hat{p}(1-\hat{p}) + z_{\alpha/2}^2/4n]/n} \right) / (1 + z_{\alpha/2}^2/n).$$

Here $\hat{p}$ is the observed fraction of favorite ratings, $z_{\alpha/2}$ is the $(1-\alpha/2)$ quantile of the standard normal distribution, and n is the total number of ratings. See, Agresti, Alan and Brent A. Coull (1998), "Approximate is Better than 'Exact' for Interval Estimation of Binomial Proportions," The American Statistician, 52, 119-126 and Wilson, E. B. (1927), "Probable Inference, the Law of Succession, and Statistical Inference," Journal of the American Statistical Association, 22, 209-212.

The age (a) of a room image relative to all (or at least a larger set of) room images in images storage 15 may be determined by assigning to each room image an age score relative to a predetermined past date such as by calculating the difference between a date a room image is uploaded to image storage 15 and a predetermined past date. More specifically, the age (a) of a room image relative to all (or at least a larger set of) room images in images storage 15 may be determined by calculating for each room image in the set of room images $$a = \log_{10}(t_s) * y, \text{ where}$$

$$t_s = A - B \text{ (e.g., in seconds)},$$

A corresponds to a date a room image is uploaded to image storage 15, and
B corresponds to a predetermined past date (e.g., Coordinated Universal Time (UTC) 1:29:00 PM, Apr. 10, 2017), and
y=score weight factor (e.g., 10, 100, 1000).

The completion of rooms corresponding to the room images 42 relative to the set of rooms corresponding to all (or at least a larger set of) room images in images storage 15 may be determined by assigning to each room image a completion score based on a number of feature images corresponding to each room image. In one embodiment, a higher number of feature images corresponding to a room image may correspond to a higher number for the completion score of the room image. In another embodiment, completion may be scored based on the number of typical/proposed features for the room type; a room whose number of associated features corresponds to the typical/proposed features for the room type would have a perfect score while a room whose number of associated features is less than the typical/proposed features for the room type would have a lower score. In yet another embodiment, the completion score may be calculated using a combination of these approaches.

The strength of users corresponding to the room images relative to a set of users corresponding to all (or at least a larger set of) room images in images storage 15 may be determined by assigning each image a user weight score. The user weight score assigned to a room image may be based on a number of images (room or feature images) a user who submitted the room image has submitted, a number of images submitted by the user being used in other users' rooms, whether a user is a certified or a sponsoring user of the system 5, how recently a user last used the system 5, etc.

Feature Selector 50

As described above in reference to FIG. 5, based on user input, feature selector 50 may present first feature images to the user U. In one embodiment, the feature selector 50 determines the first feature images 52 to be presented based on a ranking of the feature image. Such ranking (w) may be based on one or more of: popularity (p) of a feature image relative to all (or at least a larger set of) feature images in images storage 15, age (a) of a feature image relative to all (or at least a larger set of) feature images in images storage 15, completion (c) of a room corresponding to a feature image relative to all (or at least a larger set of) feature images in images storage 15, whether the feature image's tags match the décor style, strength (u) of a user corresponding to a feature image relative to a set of users corresponding to all (or at least a larger set of) feature images in images storage 15, a user's selected preferences in system 5, sponsorship of features, a user's browsing history or browsing pattern in or outside the system 5, etc. For example, the ranking (w) may be calculated as $$w = p + a + c + u$$

The popularity (p) of a feature image relative to all (or at least a larger set of) feature images in images storage 15 may be determined by assigning to each feature image in the set of feature images a popularity score based on a number of times each feature image has been selected by users. More specifically, the popularity (p) of a feature image relative to all (or at least a larger set of) of feature images in images storage 15 may be determined by calculating for each feature image in the set of feature images $$p = (\log_{10}(s) * x) + W, \text{ where}$$

s=score corresponding to a number of times each feature image or feature images corresponding to each feature image has been selected by users,
x=a score weight factor (e.g., 50, 500, 5000), and
W=the lower bound of the Wilson score confidence on the number of times each feature image has been indicated as a favorite by users versus the number of times each feature image has been selected by users.

$$W = \left( \hat{p} + \frac{z_{\alpha/2}^2}{2n} \pm z_{\alpha/2} \sqrt{[\hat{p}(1-\hat{p}) + z_{\alpha/2}^2/4n]/n} \right) / (1 + z_{\alpha/2}^2/n).$$

Here $\hat{p}$ is the observed fraction of favorite ratings, $z_{\alpha/2}$ is the $(1-\alpha/2)$ quantile of the standard normal distribution, and n is the total number of ratings. See, Agresti, Alan and Brent A. Coull (1998), "Approximate is Better than 'Exact' for Interval Estimation of Binomial Proportions," The American Statistician, 52, 119-126 and Wilson, E. B. (1927), "Probable Inference, the Law of Succession, and Statistical Inference," Journal of the American Statistical Association, 22, 209-212.

The age (a) of a feature image relative to all (or at least a larger set of) feature images in images storage 15 may be determined by assigning to each feature image an age score relative to a predetermined past date such as by calculating the difference between a date a feature image is uploaded to image storage 15 and a predetermined past date. More specifically, the age (a) of a feature image relative to all (or at least a larger set of) feature images in images storage 15 may be determined by calculating for each feature image in the set of feature images $$a = \log_{10}(t_s) * y, \text{ where}$$

$$t_s = A - B \text{ (e.g., in seconds)},$$

A corresponds to a date a feature image is uploaded to image storage 15, and
B corresponds to a predetermined past date (e.g., Coordinated Universal Time (UTC) 1:29:00 PM, Apr. 10, 2017), and
y=score weight factor (e.g., 10, 100, 1000).

The completion (c) of rooms corresponding to the feature images 52 relative to the set of rooms corresponding to all (or at least a larger set of) feature images in images storage 15 may be determined by assigning to each feature image a completion score based on a number of feature images corresponding to each room image. A higher number of feature images corresponding to a room image corresponds to a higher number for the completion score of the feature image.

The strength (u) of users corresponding to the feature images relative to a set of users corresponding to all (or at least a larger set of) feature images in images storage 15 may be determined by assigning each image a user weight score. The user weight score assigned to a feature image may be based on a number of images (room or feature images) a user who submitted the feature image has submitted, a number of images submitted by the user being used in other users' rooms, whether a user is a certified or a sponsoring user of the system 5, how recently a user last used the system 5, etc.

Feature Shuffler 53

As described above in reference to FIG. 5, the user U may select a feature shuffler 53 to command display of a feature image for a missing feature 54. In one embodiment, the feature shuffler 53 selects the feature image for a missing feature by scoring feature images and selecting the from the highest scored feature images. Key factors that may influence the scores include the ranking (w). Specifically, the ranking (S) of each feature image may be calculated as:

$$S(w, g) = \begin{cases} w*g - \\ \quad \text{if the feature image matches the room type and the decor style} \\ w*\frac{g}{3} - \text{if the feature image matches the room type only} \end{cases}$$

where
w is calculated as described above for the feature selector 50, and
g is a constant (e.g., 9.81, 98.1).

The ranking (S) of each feature image may alternatively be calculated as:

$$S(w, g) = \begin{cases} w*g - \\ \quad \text{if the feature image matches the room type and the decor style} \\ w*\frac{2g}{3} - \text{if the feature image matches the room type only} \\ w*\frac{g}{3} - \text{otherwise} \end{cases}$$

where
w is calculated as described above for the feature selector 50, and
g is a constant (e.g., 9.81, 98.1).

Auto Filler 55

As described above in reference to FIG. 5, the auto-filler or auto-fill function 55 is selectable by the user U to command presentation of auto-fill feature images for missing features 54 so that the room may be automatically completed. In one embodiment, the auto-filler 55 selects the auto-fill feature images by assigning to each feature image a match fill score (MFS) that may be calculated as $$MFS(w,c)=(wd)*c, \text{ where}$$

w is calculated as described above for the feature selector 50,
d corresponds to a damping factor (e.g., 0.85, 8.5, 85.0), and $$c=m+u*(3f), \text{ where}$$

m corresponds to a number of times a feature image is selected by users in conjunction with other feature images already in the room,
u corresponds to a number of times the feature image was nailed and used as basis for auto-fill, and
f corresponds to a number of times the feature image is selected by users as a favorite.

If no feature images result from the above calculation, in one embodiment, the auto-filler 55 selects the auto-fill feature images by assigning to each feature image an additional fill score (AFS) that may be calculated as $$AFS(w)=w*(d/3), \text{ where}$$

w is calculated as described above for the feature selector 50, and
d corresponds to a damping factor (e.g., 0.85, 8.5, 85.0).

Example methods may be better appreciated with reference to flow diagrams.

Figure 9:
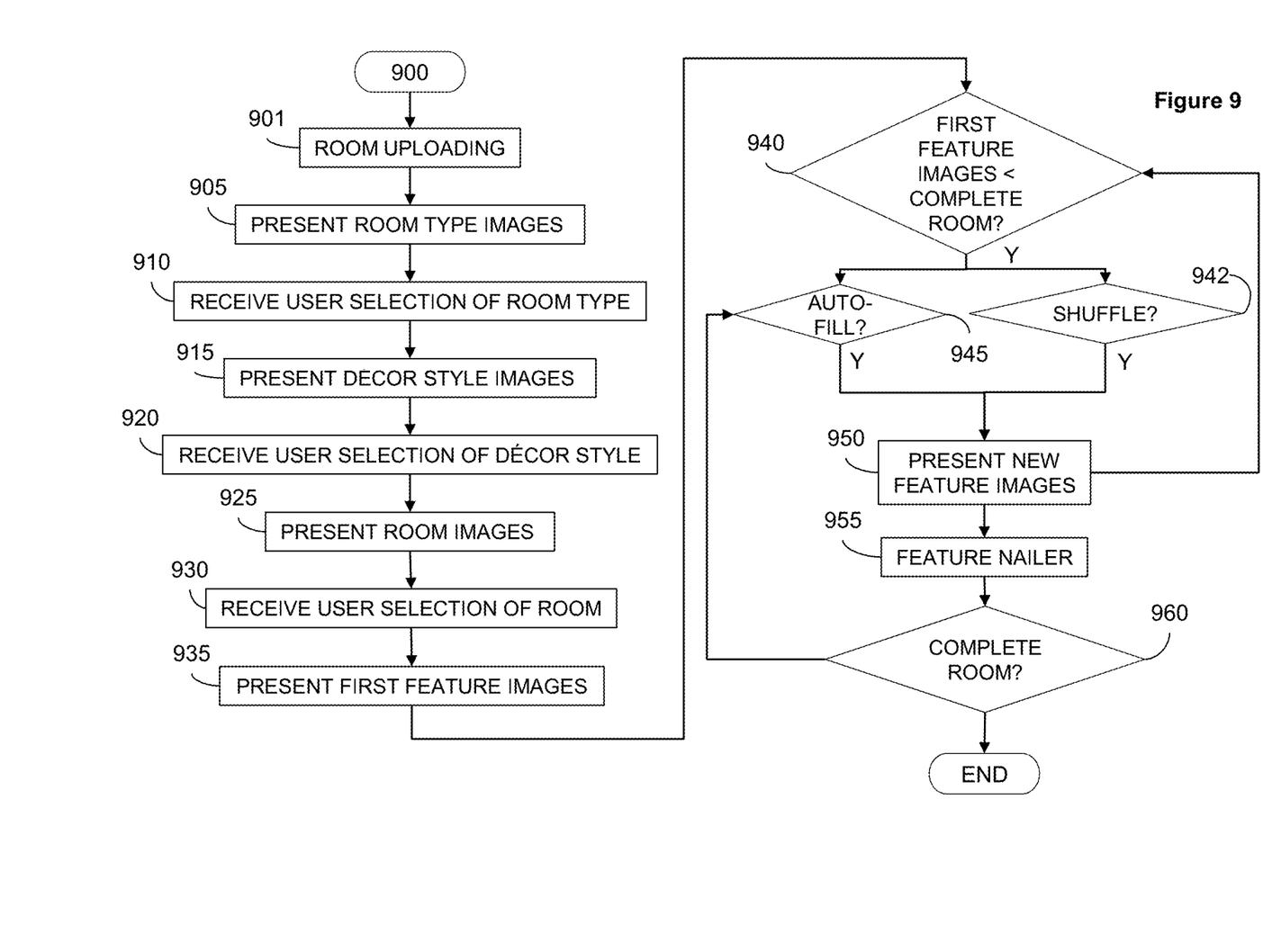
FIG. 9 illustrates a flow diagram for an exemplary method.

FIG. 9 illustrates a flow diagram for an exemplary method 900. At 901, the method 900 may give users the ability to upload rooms. Uploading rooms may include uploading a room image and corresponding feature images of features in the room. The user may tag the room images and the feature images as, for example, corresponding to a room type, a décor style, a feature type (e.g., flooring, lights, etc.). The room images and feature images may also be tagged to identify the user who uploaded the images. Another tag may be a running tag that includes information as to how many times the room image or the feature image has been selected or nailed by other users to include in their own rooms. The system 5 may use the tag information as part of its algorithm to make recommendations for rooms and features to users.

At 905, the method 900 may include presenting room type images corresponding to visual depictions of room types. At 910, the method 900 may include receiving user input including data indicative of selection by the user of a particular room type by selection of a corresponding room type image. At 915, the method 900 may include presenting décor style images corresponding to visual depictions of décor styles for the particular room type. At 920, the method 900 may include receiving user input including data indicative of selection by the user of a particular décor style by selection of a corresponding décor style image.

At 925, the method 900 may include presenting room images corresponding to visual depictions of rooms of the particular room type decorated in the particular décor style. At 930, the method 900 may include receiving user input including data indicative of selection by the user of a particular room by selection of a corresponding room image. The particular room may include the first feature images to be presented to the user.

At 935, the method 900 may include presenting the first feature images, which correspond to visual depictions of a features or products matching the particular room type and the particular décor style selected by the user. In one embodiment, presenting the feature images includes ranking a set of feature images and selecting the feature images to present from the set of feature images based on the ranking as described above.

At 940, if the first feature images correspond to less than a predetermined number of feature images that form part of a complete room, at 942, the method 900 may include receiving user input including data indicative of selection by the user of a shuffle function and, at 950, presenting second feature images that include the first feature images and at least one other feature image that has been shuffled in.

Returning to 940, if the first feature images still correspond to less than a predetermined number of feature images that form part of a complete room, at 945, the method 900 may include receiving user input including data indicative of selection by the user of an auto-fill function and, at 950, presenting second feature images that include the first feature images and correspond to the predetermined number of feature images that form part of the complete room.

At 955, the method 900 may include displaying in association with each of the feature images a feature nailer. Each instance of the feature nailer may be selectable by the user to lock or retain its associated feature image. The method 900 may include receiving user input including data indicative of selection by the user of at least one particular instance of the feature nailer, thereby locking or retaining a respective at least one feature image.

At 960, if the room is not yet complete, returning to 945, the method 900 may include receiving user input including data indicative of selection by the user of an auto-fill function and, at 950, presenting second feature images including new feature images and the feature images locked or retained by the user by using the feature nailer and at least one other feature image.

At 960, if the user has nailed down all of the features, the room is complete.

While FIG. 9 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 10:
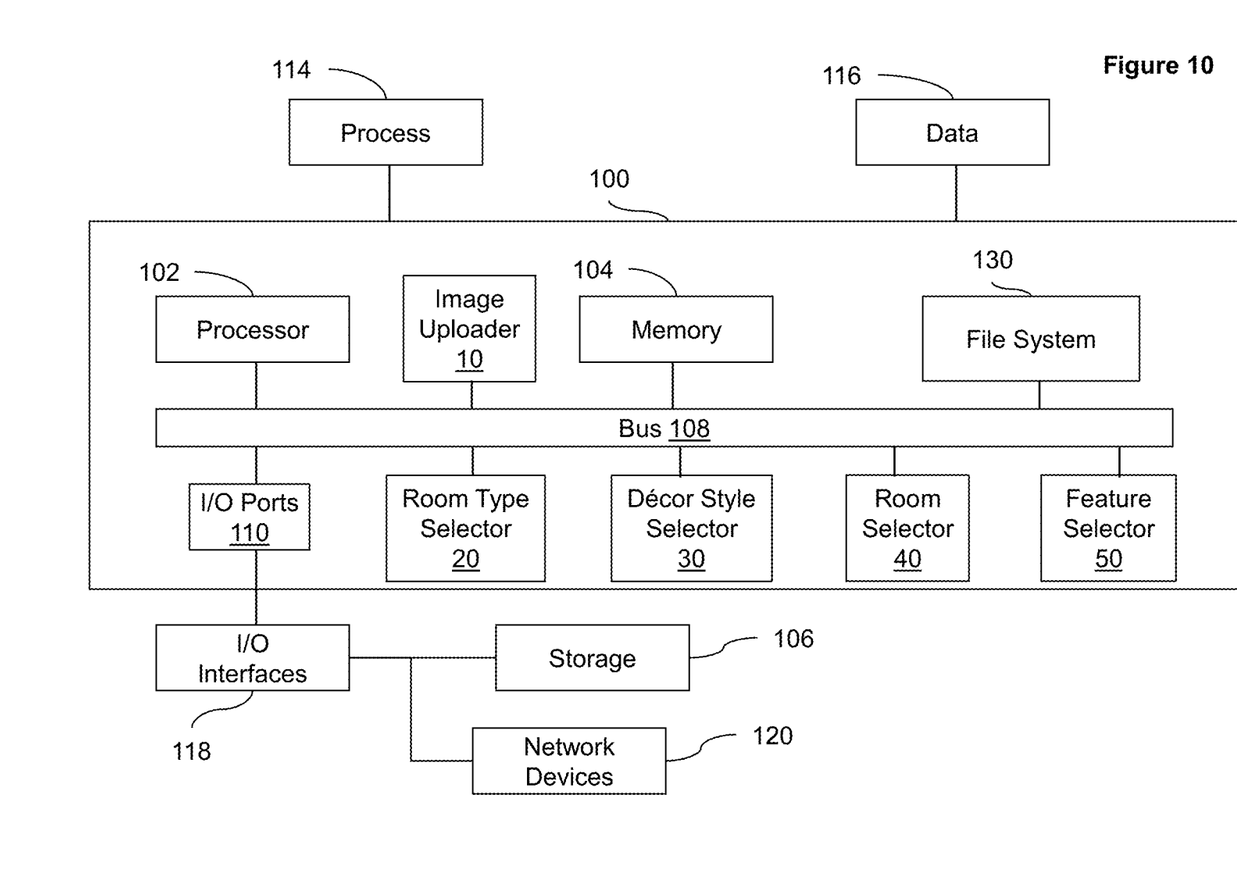
FIG. 10 illustrates a block diagram of an exemplary apparatus, machine, or computer system that may be used to implement features of the disclosed embodiments.

FIG. 10 illustrates a block diagram of an exemplary apparatus, machine, or computer system 50 that may be used to implement features of embodiments of the disclosed system 5 or method 900. The machine 100 includes a processor 102, a memory 104, and I/O Ports 110 operably connected by a bus 108.

In one example, the machine 100 may transmit input and output signals via, for example, I/O Ports 110 or I/O Interfaces 118. The machine 100 may also include the image uploader 10, the room type selector 20, the décor style selector 30, the room selector 40, the feature selector 50, and all of their components. Thus, the image uploader 10, the room type selector 20, the décor style selector 30, the room selector 40, the feature selector 50 may be implemented in machine 100 as hardware, firmware, software, or combinations thereof and, thus, the machine 100 and its components may provide means for performing functions described herein as performed by the image uploader 10, the room type selector 20, the décor style selector 30, the room selector 40, the feature selector 50.

The processor 102 can be a variety of various processors including dual microprocessor and other multi-processor architectures. The memory 104 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A storage 106 (which may include the image storage 15) may be operably connected to the machine 100 via, for example, an I/O Interfaces (e.g., card, device) 118 and an I/O Ports 110. The storage 106 can include, but is not limited to, devices like a magnetic disk drive, a solid state disk drive, a floppy disk drive, a tape drive, a Zip drive, a flash memory card, or a memory stick. Furthermore, the storage 106 can include optical drives like a CD-ROM, a CD recordable drive (CD-R drive), a CD rewriteable drive (CD-RW drive), or a digital video ROM drive (DVD ROM). The memory 104 can store processes 114 or data 116, for example. The storage 106 or memory 104 can store an operating system that controls and allocates resources of the machine 100.

The bus 108 can be a single internal bus interconnect architecture or other bus or mesh architectures. While a single bus is illustrated, it is to be appreciated that machine 100 may communicate with various devices, logics, and peripherals using other busses that are not illustrated (e.g., PCIE, SATA, Infiniband, 1394, USB, Ethernet). The bus 108 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 100 may interact with input/output devices via I/O Interfaces 118 and I/O Ports 110. Input/output devices can include, but are not limited to, a keyboard, a microphone, a pointing and selection device, cameras, video cards, displays, storage 106, image storage 15, network devices 120, and the like. The I/O Ports 110 can include but are not limited to, serial ports, parallel ports, and USB ports.

The machine 100 can operate in a network environment and thus may be connected to network devices 120 via the I/O Interfaces 118, or the I/O Ports 110. Through the network devices 120, the machine 100 may interact with a network. Through the network, the machine 100 may be logically connected to remote devices. The networks with which the machine 100 may interact include, but are not limited to, a local area network (LAN), a wide area network (WAN), and other networks. The network devices 120 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 120 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

The invention claimed is:

1. A method comprising:
   presenting, via a computer system, a first plurality of feature images corresponding to visual depictions of a first plurality of features or products, each of the feature images corresponding to a respective feature or product from the plurality of features or products; wherein first plurality of feature images corresponds to less than a predetermined number of feature images that form part of a complete room;
   receiving, at the computer system and from a user, user input including data indicative of selection by the user of an auto-fill function selectable by the user to command presentation by the computer system of a second plurality of feature images that includes the first plurality of feature images and corresponds to the predetermined number of feature images that form part of the complete room;
   presenting, via the computer system, the second plurality of feature images that includes the first plurality of feature images and corresponds to the predetermined number of feature images that form part of the complete rooms;
   presenting, via the computer system, a plurality of room type images corresponding to visual depictions of a plurality of room types, each of the room type images corresponding to a respective room type from the plurality of room types;
   receiving, at the computer system and from a user, user input including data indicative of selection by the user of a particular room type from the plurality of room types by selection of a corresponding room type image from the plurality of room type images;
   presenting, via the computer system, a plurality of décor style images corresponding to visual depictions of a plurality of décor styles for the particular room type, each of the décor style images corresponding to a respective décor style from the plurality of décor styles;
   receiving, at the computer system and from the user, user input including data indicative of selection by the user of a particular décor style from the plurality of décor styles by selection of a corresponding décor style image from the plurality of décor style images;
   presenting, via the computer system, a plurality of room images corresponding to visual depictions of a plurality of rooms of the particular room type decorated in the particular décor style, each of the room images corresponding to a respective room from the plurality of rooms; and
   receiving, at the computer system and from the user, user input including data indicative of selection by the user of a particular room from the plurality of rooms by selection of a corresponding room image from the plurality of room images,
   wherein the presenting the second plurality of feature images includes presenting auto-fill feature images in addition to the first plurality of feature images, the auto-fill feature images selected to match the particular room type and the particular décor style,
   wherein the presenting the second plurality of feature images includes presenting auto-fill feature images in addition to the first plurality of feature images, the auto-fill feature images selected by calculating for each auto-fill feature image a match fill score $MFS(w,c)=(wd)*c$, where
   w=is a function of:
      popularity of the plurality of a feature image relative to the set of feature images,
      age of a feature images relative to the set of feature images,
      completion of a plurality of rooms corresponding to the feature image relative to a set of rooms corresponding to the set of feature images, and
      strength of a user corresponding to the feature image relative to a set of users corresponding to the set of feature images,
   d corresponds to a damping factor, and
   $c=m+u*(3f)$, where m corresponds to a number of times the feature image is selected by users in conjunction with other feature images in the first plurality of images, u corresponds to a number of times the feature image forms part of the first plurality of feature images, and f corresponds to a number of times the feature image is selected by users as a favorite.

2. An apparatus comprising:

a processor;

a feature selector that works in cooperation with the processor to:
- present a first plurality of feature images corresponding to visual depictions of a first plurality of features or products, each of the feature images corresponding to a respective feature or product from the plurality of features or products; wherein first plurality of feature images corresponds to less than a predetermined number of feature images that form part of a complete room; and
- receive from a user user input including data indicative of selection by the user of an auto-fill function selectable by the user to command presentation by the computer system of a second plurality of feature images that includes the first plurality of feature images and corresponds to the predetermined number of feature images that form part of the complete room;

an auto filler that works in cooperation with the processor to:
- present the second plurality of feature images that includes the first plurality of feature images and corresponds to the predetermined number of feature images that form part of the complete room;

a room type selector that works in cooperation with the processor to:
- present a plurality of room type images corresponding to visual depictions of a plurality of room types, each of the room type images corresponding to a respective room type from the plurality of room types; and
- receiving from a user user input including data indicative of selection by the user of the particular room type from the plurality of room types by selection of a corresponding room type image from the plurality of room type images; a décor style selector that works in cooperation with the processor to:
- present a plurality of décor style images corresponding to visual depictions of a plurality of décor styles for the particular room type, each of the décor style images corresponding to a respective décor style from the plurality of décor styles; and
- receive from the user user input including data indicative of selection by the user of the particular décor style from the plurality of décor styles by selection of a corresponding décor style image from the plurality of décor style images;

a room selector that works in cooperation with the processor to:
- present a plurality of room images corresponding to visual depictions of a plurality of rooms of the particular room type decorated in the particular décor style, each of the room images corresponding to a respective room from the plurality of rooms; and
- receive from the user user input including data indicative of selection by the user of a particular room from the plurality of rooms by selection of a corresponding room image from the plurality of room images, wherein the particular room includes the first plurality of feature images, wherein the second plurality of feature images presented by the auto filler includes auto-fill feature images in addition to the first plurality of feature images, and the auto filler selects the auto-fill feature images to match the particular room type and the particular décor style, wherein the auto filler selects the auto-fill feature images by assigning to each auto-fill feature image a match fill score (MFS) calculated as $MFS(w,c) = (wd)*c$, where w=is a function of:
- popularity of the plurality of a feature image relative to a set of feature images,
- age of a feature images relative to the set of feature images,
- completion of a plurality of rooms corresponding to the feature image relative to a set of rooms corresponding to the set of feature images, and
- strength of a user corresponding to the feature image relative to a set of users corresponding to the set of feature images, d corresponds to a damping factor, and $c = m + u*(3f)$, where m corresponds to a number of times the feature image is selected by users in conjunction with other feature images in the first plurality of images, u corresponds to a number of times the feature image forms part of the first plurality of feature images, and f corresponds to a number of times the feature image is selected by users as a favorite.

* * * * *